United States Patent [19]

Miyauchi et al.

[11] Patent Number: 5,232,793
[45] Date of Patent: Aug. 3, 1993

[54] METHOD OF AND APPARATUS FOR UTILIZING AND RECOVERING $CO_2$ IN COMBUSTION EXHAUST GAS

[75] Inventors: Toshio Miyauchi; Tetsuya Hirata; Hideto Ikeda; Kenzo Nakazawa; Hiroyoshi Uematsu, all of Yokohama; Satoshi Hatori, Tone, all of Japan

[73] Assignee: Ishikawajima-Harima Heavy Industries Co., Ltd., Tokyo, Japan

[21] Appl. No.: 584,209

[22] Filed: Sep. 18, 1990

[30] Foreign Application Priority Data

Sep. 19, 1989 [JP] Japan .................. 1-240831
Jan. 31, 1990 [JP] Japan .................. 2-21369
May 30, 1990 [JP] Japan .................. 2-140397

[51] Int. Cl.$^5$ .................. H01M 8/06; H01M 8/14
[52] U.S. Cl. .................. 429/16; 429/17; 429/20; 423/438
[58] Field of Search .................. 429/16, 17, 20; 423/438

[56] References Cited

U.S. PATENT DOCUMENTS

| | | | |
|---|---|---|---|
| 3,359,134 | 12/1967 | Savadori et al. | 136/86 |
| 4,042,755 | 8/1977 | Anbar | 429/16 |
| 4,722,873 | 2/1988 | Matsumura | 429/16 X |
| 4,743,516 | 5/1988 | Noguchi et al. | 429/16 |
| 4,751,151 | 6/1988 | Healy et al. | 429/17 |
| 4,791,033 | 12/1988 | Patel | 429/19 |

FOREIGN PATENT DOCUMENTS

| | | |
|---|---|---|
| 2004449 | 2/1972 | Fed. Rep. of Germany . |
| 1436747 | 3/1966 | France . |
| 2500217 | 8/1982 | France . |
| 56-69775 | 8/1981 | Japan . |
| 1-128364 | 5/1989 | Japan . |
| 971776 | 9/1964 | United Kingdom . |

OTHER PUBLICATIONS

Chemical Abstracts, vol. 110, No. 12, Mar. 20, 1989, Columbus, Ohio, US; abstract No. 98842P; Mitsuta Susumu and All: 'Energy recovery from fuel-cell of-f-gas' p. 216; col. 1.
Patent Abstracts of Japan vol. 15, No. 498 (E-1146) (5026) Dec. 17, 1991.
Journal of the Electrochemical Society, vol. 130, No. 1, Jan. 1983, pp. 20–28; J. L. Weaver and All: 'The Molten Carbonate Carbon Dioxide Concentrator: Cathode Performance at High $CO_2$ Utilization Extended Abstract, vol. 87, No. 2, Oct. 18, 1987, pp. 261–262.
M. Krumpelt and All: 'Systems Analyses for High--Temperature Fuel Cells-abstract No. 178'.
European Search Report, Application No. EP 9011 8035, Dec. 10, 1991.
Patent Abstracts of Japan vol. 13, No. 374 (E-808) (3722) Aug. 18, 1989.

*Primary Examiner*—Stephen Kalafut
*Attorney, Agent, or Firm*—Trexler, Bushnell, Giangiorgi & Blackstone, Ltd.

[57] ABSTRACT

A method of recovering carbon dioxide gas from the combustion exhaust gas of fossil fuel, using a combustion equipment, wherein fuel gas is supplied to an anode chamber of a molten carbonate fuel cell and oxidizing gas is supplied to a cathode chamber of the fuel cell, the combustion exhaust gas from the combustion equipment is suuplied to the cathode chamber as part of the oxidizaing gas, $CO_2$ in the combustion exhaust gas is allowed to react with $O_2$ in the oxidizing gas at the cathode to produce carbonate ion, which is allowed to pass through the electrolyte of the fuel cell and to reach the anode, which the carbonate ion is allowed to react with hydrogen in the fuel gas to produce $CO_2$ and $H_2O$, the anode exhaust gas containing $CO_2$ and $H_2O$ generated at the anode is discharged from the anode chamber, $H_2O$ is separated from the anode discharge gas and high-concentration $CO_2$ gas is recovered.

55 Claims, 6 Drawing Sheets

METHOD OF AND APPARATUS FOR UTILIZING AND RECOVERING CO₂ IN COMBUSTION EXHAUST GAS

BACKGROUND OF THE INVENTION

1. Technical Field

The present invention relates to methods and apparatuses to utilize and recover $CO_2$ contained in combustion exhaust gas of fossil fuel such as coal in an attempt to remove carbon dioxide gas ($CO_2$) contained in the combustion exhaust gas before it is discharged to atmosphere.

2. Background Art

Combustion exhaust gas from a combustion equipment using fossil fuel contains a large volume of $CO_2$. In particular, exhaust gas generated from thermal power plants using coal, LNG and petroleum or exhaust gas from gas turbine generators is enormous, and $CO_2$ contained in the exhaust gas which is simultaneously generated from the thermal power plants is also tremendous. Conventionally, a large volume of exhaust gas generated from the thermal power plants is discharged to atmosphere without recovering $CO_2$ contained the exhaust gas. Recently, various approaches have been propsed to recover $CO_2$. For instance, it was proposed to discharge the exhaust gas into the open sea or to convert it into useful substances for recycle.

The table below shows the volume of $CO_2$ discharged from the thermal power plants with respect to installed capacity and generated energy. The values used in the table for installed capacity and generated energy are specified by the power construction project plan for 1995 prepared in accordance with actual results of 1985.

|  | Installed capacity ($\times 10^4$ KW) | Generated energy ($\times 10^8$ KWH) | $CO_2$ discharge rate | | |
|---|---|---|---|---|---|
|  |  |  | $Nm^3$/KWH | $\times 10^8$ $Nm^3$ | Ratio |
| Coal | 2300 | 990 | 0.42 | 416 | 32.1 |
| LNG | 4300 | 1660 | 0.24 | 398 | 30.8 |
| Petroleum | 5100 | 1600 | 0.30 | 480 | 37.1 |
| Total | 11700 | 4250 |  | 1294 | 100 |

As shown in the table above, the coal-fired thermal power plant discharges 0.42 $Nm^3$KWH of $CO_2$, LNG-fired thermal power plant 0.24 $Nm^3$/KWH and petroleum-fired thermal power plant 0.30 $Nm^3$/KWH, thereby evidencing the discharge of a great volume of $CO_2$.

As discussed above, since a large amount of $CO_2$ is expelled to atmosphere from the thermal power plants, long wave long radiation from the earth surface is absorbed by $CO_2$ expelled. This prevents the long wave long radiation from permeating through the atmosphere, thereby warming the earth surface and lower atmosphere and causing the green-house effect and an environmental pollution problem. As the measure to prevent this green-house effect, the recovery of $CO_2$ discharged from the thermal power plants is imperative and its effective recovery method has been investigated. However, as mentioned above, the $CO_2$ volume discharged from the thermal power plants is enormous. In general, the concentration of SOx and NOx contained in the flue gas is just small (150 to 200 ppm at most) whereas that of $CO_2$ is said to be some hundred thousand ppm. It is believed to be impossible to treat $CO_2$ with the current removal technique such as the flue gas desulfurization or denitration process, and no economical technique has been developed to recover $CO_2$ from the condition diluted with a great volume of air. As for the technique to discharge $CO_2$ into the sea proposed as one of $CO_2$ disposal methods, $CO_2$ recovered in some manner must be discharged to the sea after liquefaction, which raises problems to consume extra electric power in recovering, liquefying and transporting $CO_2$ to the offing.

SUMMARY OF THE INVENTION

An object of the present invention is to provide a method of and an apparatus for recovering $CO_2$ contained in combustion exhaust gas discharged from combustion equipment of fossil fuel to minimize the volume of $CO_2$ released to atmosphere.

Another object of the present invention is to provide a method of and an appratus for utilizing $CO_2$ contained in combustion exhaust gas for cell reactions of a molten carbonate fuel cell.

Still another object is to provide a method of and an apparatus for recovering $CO_2$ from anode exhaust gas discharged from an anode of a fuel cell to utilize $CO_2$ contained in combustion exhaust gas for cell reactions.

According to one aspect of the present invention, there is provided a method of recovering $CO_2$ contained in fossil fuel combustion exhaust gas, comprising:

feeding oxidizing gas to a cathode chamber of a molten carbonate fuel cell as well as feeding fuel gas to an anode chamber of the same fuel cell;

feeding combustion exhaust gas to the cathode as part of the oxidizing gas;

allowing $CO_2$ in the combination exhaust gas to react with $O_2$ in the oxidizing gas at the cathode to generate carbonate ion, allowing the carbonate ion to pass through an electrolyte of the molten carbonate fuel cell and reach the anode, whereby the carbonate ion is allowed to react with hydrogen of the fuel gas at the anode to form $CO_2$ and $H_2O$;

releasing from the anode chamber the anode exhaust gas containing $CO_2$ and $H_2O$ generated at the anode; and recovering high-concentration $CO_2$ gas by separating $H_2O$ from the anode exhaust gas.

The present invention also provides a method of utilizing carbon dioxide gas of combustion exhaust gas discharged from a fossil fuel combustion equipment, comprising:

feeding exidizing gas to a cathode chamber and feeding fuel gas to an anode chamber of a molten carbonate fuel cell;

feeding combustion exhaust gas to a cathode as part of the oxidizing gas;

allowing $CO_2$ of the combustion exhaust gas to react with $O_2$ of the oxidizing gas a the cathode to generate carbonate ion, allowing the carbonate ion to pass through an electrolyte of the molten carbonate fuel cell and reach the andoe, whereby the carbonate ion is allowed to react with hydrogen of th fuel gas at the anode to form $CO_2$ and $H_2O$; and releasing the anode exhaust gas containing $CO_2$ and $H_2O$ generated at the anode from the anode chamber and releasing cathode exhaust gas containing dilute $CO_2$ from the cathode chamber to atmosphere.

The present invention further provides a methode of utilizing and recovering carbon dioxide gas of fossil fuel combustion exhaust gas, comprising:

mixing the fossil fuel combustion exhaust gas with air and feeding them as oxidizing gas to a cathode chamber of a molten carbonate fuel cell;

feeding fuel gas to an anode chamber of the molten carbonate fuel cell;

allowing $CO_2$ of the combustion exhaust gas to react with $O_2$ of the oxidizing gas at the cathode to generate carbonate ion, which ion is allowed to pass through an electrolyte of the molten carbonate fuel cell and reach the anode, at which the carbonate ion is allowed to react with hydrogen in the fuel gas to form $CO_2$ and $H_2O$;

releasing from the anode chamber the anode exhaust gas containing $CO_2$ and $H_2O$ generated at the andoe; and separating $H_2O$ from the anode exhaust gas to recover high-concentration $CO_2$ gas.

The present invention also provides apparatuses for carrying out the above-described methods.

DESCRIPTION OF THE PREFERRED EMBODIMENTS

Referring now to the accompanying drawings, embodiments of the present invention will be described in depth.

Figure 1:
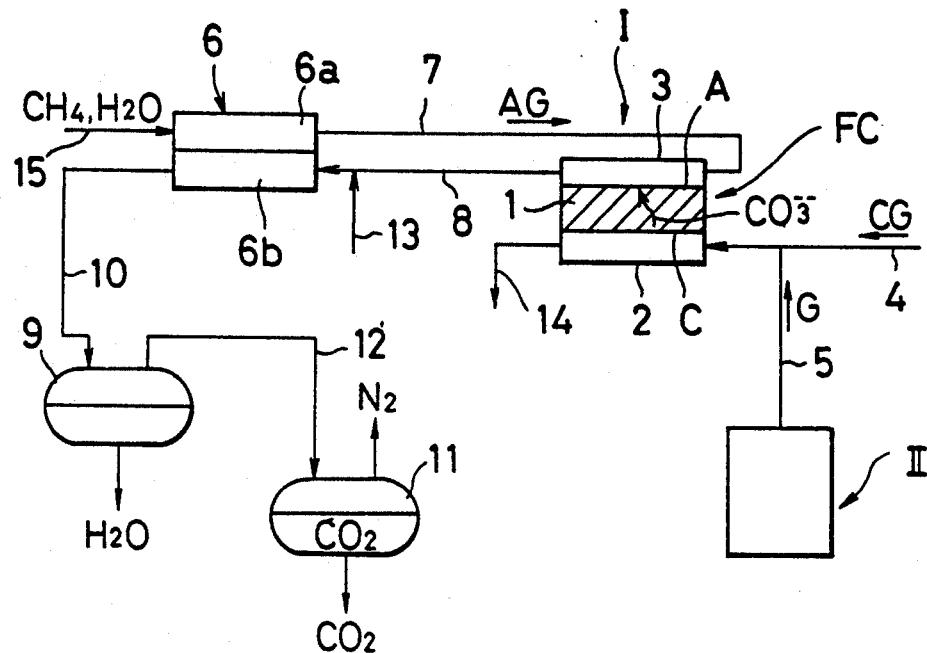
FIG. 1 is a system diagram showing one embodiment of the present invention.

In FIG. 1, an electrolyte tile (electrolyete plate) 1 including a molten carbonate soaked in a porous substance as an electrolyte is held between a cathode (oxygen electrode) C and an anode (fuel electrode) A, and a cathode chamber 2 is formed at the cathode C to introduce oxidizing gas, which contains $CO_2$, $O_2$ and $N_2$, and anᴇ de chamber 3 is formed at the anode A to introduce fuel gas, which contains H, CO and $H_2O$. A fuel cell element is formed by the electrolyte tile 1, cathode C, anode A, chatode chamber 2 and anode chamber 3. A molten carbonate fuel cell FC is formed by stacking the cell elements in multi-layers.

The molten carbonate fuel cell system I is incorporated into a combustion equipment II which uses fossil fuel, that is, a combustion exhaust gas line 5 of the combustion equipment II is connected to an oxidizing gas feed line 4, which is connected to the supply side of the cathode chamber 2 of the molten carbonate fuel cell FC, so that the fossil fuel combustion exhaust gas G is fed to the cathode chamber 2 as part of the oxidizing gas CG. A reforming chamber 6a of a reformer 6 is connected to the anode chamber 3 by a fuel gas line 7 to feed into the anode chamber 3 the fuel gas AG which is reformed at the reformer 6. On the other hand, the exhaust side of the anode chamber 3 is connected to a combustion chamber 6b of te reformer 6 by an anode exhaust gas line 8. Methane $CH_4$ and steam $H_2O$ are fed as fuel to the reforming chamber 6a of the reformer 6 through a suypply line 15 and fed to the anode chamber 3 after the reforming at the reforming chamber 6a. $CO_2$ and $H_2O$ produced upon reactions at the anode chamber 3 and unreacted $H_2$ are released into the anode exhaust gas line 8 as anode exhaust gas. Numeral 9 designates a gas-liquid separator, which is connected with the reformer 6 via a line 10 so that water contained in the anode exhaust gas ($CO_2$, $H_2O$) released from the combustion chamber 6b of the reformer 6 is separated. The gas-liquid separator 9 is also connected to a condenser 11 via a line 12, which condenses $CO_2$ after water is separated at the gas-liquid separator 9, so that $CO_2$ is condensed and separated from nitrogen $N_2$ and $CO_2$ is recovered as liquid. Numeral 13 denotes a line to feed either air or pure oxygen to the anode exhasut gas line 8 and numeral 14 denotes a cathode exhaust gas line connected to the exhaust side of the cathode chamber 2.

Along with $CO_2$ and $O_2$ introduced as oxidizing gas CG to the oxidizing gas supply line 4 extending to the cathode chamber 2, the fossil fuel combustion exhaust gas G, which has been disposed to atmosphere, is introduced through the combustion exhaust gas line 5 whereby $CO_2$ contained in the combustion exhaust gas G is used as part of the oxidizing gas fed to the cathode chamber 2.

$CO_2$ contained in the combustion exhaust gas G fed to the cathode chamber 2 of the fuel cell FC is allowed to react as follows at the cathode C together with the oxidizing gas:

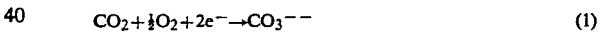

$$CO_2 + \tfrac{1}{2}O_2 + 2e^- \rightarrow CO_3^{--} \tag{1}$$

and converted into the carbonate ion $CO_3^{--}$. This carbonate ion $CO_3^{--}$ electrophoretically migrates in the tile 1 from the cathode C and reaches the anode A.

On the other hand, fuel gas reformed in the reformer 6 is fed to the anode chamber 3 from the guel gas supply line 7. Therefore, allowing the fuel gas AG fed to the anode chamber 3 to make contact with the carbonate ion $CO_3^{--}$ causes a following reaction to take place at the anode A:

$$CO_3 + H_2 \rightarrow CO_2 + H_2O + 2e^- \tag{2}$$

and $CO_2$ and $H_2$ are discharged from the anode A to the anode chamber 3, which releases $CO_2$ and $H_2O$ as anode exhaust gas containing unreacted $H_2$. This anode exhaust gas is mixed with the air or pure oxygen supplied through a line 13. The air or pure oxygen has a quantity sufficient to combust the $H_2$. The anode exhaust gas is combusted with air or oxygen at the combustion chamber 6b. The line 13 is connected to the line 8 in the course to the combustion chamber 6b of the reformer 6. The anode exhaust gas is used as heat source of the reformer 6. From the combustion chamber 6b, $CO_2$ and $H_2O$ are discharged and guided into the gas-liquid separator 9 by the line 10. In the separator 9, $H_2O$ is separated to remove $CO_2$ for recovery. In this event, when $CO_2$ is recovered in the form of liquid, $CO_2$ is guided to the condenser 11 through the line 12 and condensed. The recovered $CO_2$ is allowed to react for effective recycle. For example, the recovered $CO_2$ is allowed to react with magnesium or calcium to produce magnesium oxide (MgO) or calcium oxide (CaO). MgO is used for catalyst, absorbent, magnesia cement and pharmaceuticals, while CaO is used for lining of furnaces and crucibles, construction materials and soil conditioner. The recovered $CO_2$ may be allowed to react with sodium carbonate ($Na_2CO_3$) and water to form sodium bicarbonate (2 $NaHCO_3$). The sodium bicarbonate is used as fire extinguisher, pharmaceuticals, cleaning agent and baking powder. In addition, the recovered $CO_2$ may be allowed to react with calcium oxide (CaO) to form calcium carbonate ($CaCO_3$). The calcium carbonate can be used as industrial material, dental materials and pharmaceuticals.

In the recovery process of the combustion exhaust gas CG, allowing the carbonate ion $CO_3^{--}$ generated by reactions on the cathode C side to reach the anode A via the tile 1 and discharging $CO_2$ and $H_2O$ to the anode chamber 3 through the reaction at the anode A causes the cathode C to deliver electrons to the surroundings, thereby raising the electric potential higher than the surroundings. In contrast, the anode A receives electrons from the surroudings, thereby lowering the electric potential power than the surroundings. The electric power can be obtained by the potential difference between the cathode C and anode A.

Figure 2:
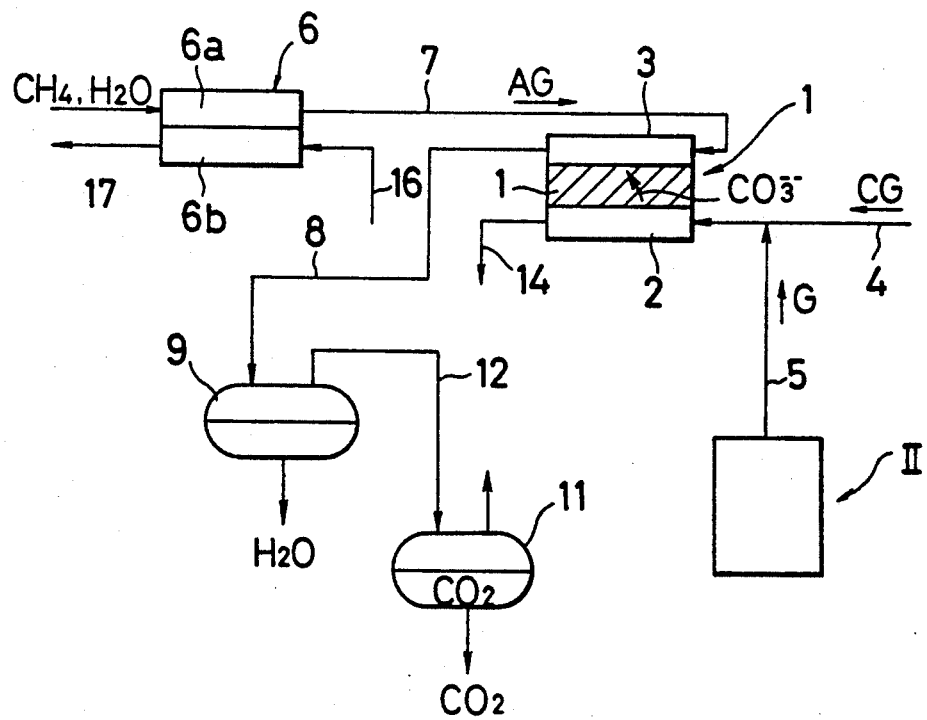
FIG. 2 is a system diagram showing another embodiment of the present invention.

FIG. 2 shows another embodiment of the present invention, which exhibits a case where the exhaust gas is utilized as heat source of the reformer 6 when the exhaust gas heat is wasted. That is, when the heat for the reformer 6 is produced from any other sources than the anode exhaust gas, high-temperature combustion exhaust gas is fed to the combustion chamber 6b from the line 16 of fossil fuel and air are fed to the combustion chamber 6b from the line 16 to combust them therein and are discharged from the exhaust line 17. The anode exit gas line 8 is connected to the gas-liquid separator 9 so that the anode exhaust gas from the anode chamber 2 is directly guided to the gas-liquid separator 9 without entering the combustion chamber 6b of the reformer 6. Also in this embodiment, $CO_2$ is condensed and recovered after separating $H_2O$ in the anode exhaust gas.

As described above, according to the present invention, $CO_2$ contained in the fossil fuel combustion exhaust gas is used as part of oxidizing gas to be supplied to the cathode of the fuel cel without disposing to atmosphere as it is, and is conveyed to the anode side as carbonate ion by the reactions at the cathode side and them removed as $CO_2$ and $H_2O$ threough reactions at the anode, and $CO_2$ is recovered by separating $H_2O$ or by further concentrating $CO_2$. This can prevent greenhouse effect caused by discharging $CO_2$ of the combustion exhaust gas to atmosphere while producing electric power as well as saving oxidizing gas supplied to the cathode.

Figure 3:
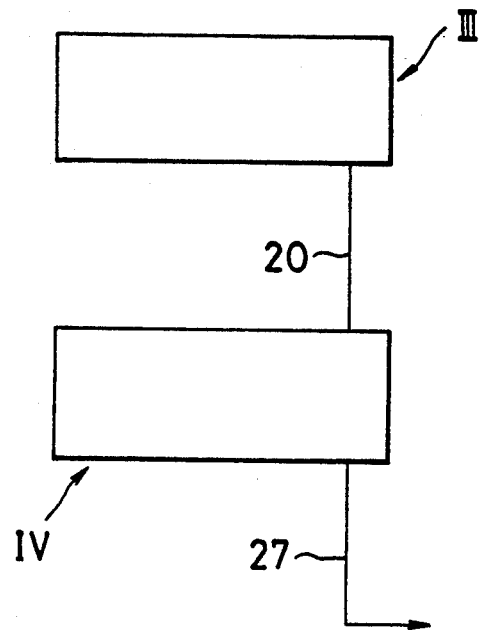
FIG. 3 is a schematic diagram of still another embodiment according to the present invention.
Figure 4:
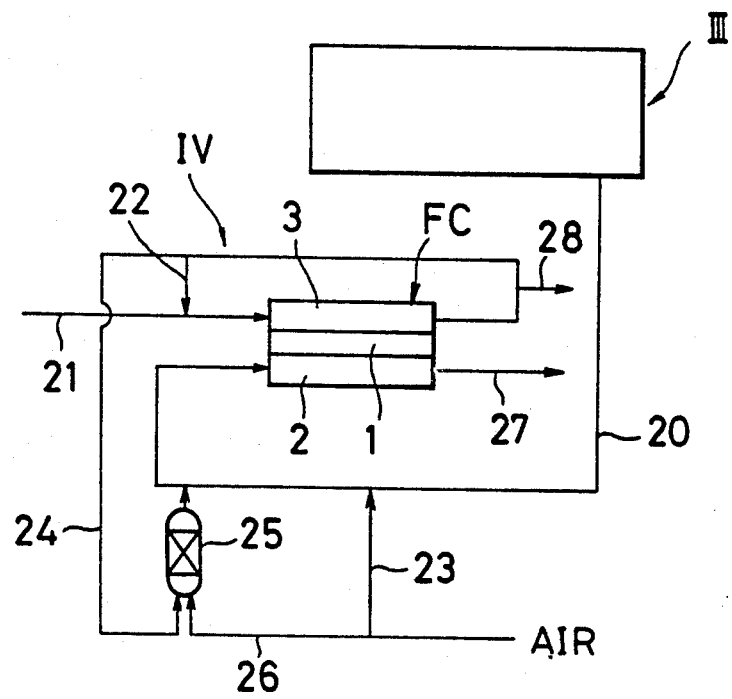
FIG. 4 is an illustration concretely showing part of FIG. 3.

FIGS. 3 and 4 in combination show one embodiment of the present invention. A coal-gasified molten carbonate fuel cell power generator IV is combined into the coal-fired thermal power plant III and the exhaust gas generated from the thermal power plant III is supplied as part of oxidizing gas to the cathode chamber of the molten carbonate fuel cell FC of the power generator IV without discharging it to atmosphere, and $CO_2$ in the exhaust gas is utilized for $CO_2$ required for reactions at the cathode. $CO_2$ is separated and recovered from the exhaust gas containing $CO_2$, thereby reducing the $CO_2$ content in the exhaust gas released from the cathode chamber of the fuel cell.

The coal-gasified used carbonate fuel cell power generator IV includes five subsystems, namely gasification, gas purification, fuel cell, bottoming cycle and power conversion adjusting. The molten carbonate fuel cell FC in the fuel cell system is as described in FIG. 1 and the exhaust gas from the thermal power plant III is directly introduced to the entrance of the cathode chamber 2 by the exhaust gas utilization line 20. Part of fuel gas and anode exhaust gas flowing through the circulation line 22 are branched to the anode chamber 3 by the fuel gasline 21. The air supply line 23 is connected to the exhaust gas utilization line 20 and the anode exhaust gas line 24 is connected to the exhaust gas line 20 via a catalyst combustor 25 so that air is fed to the cathode chamber 2 from the air supply line 23 as the oxidizing gas in addition to the exhaust gas, and other part of the anode exhaust gas discharged from the anode chamber 3 can be fed to the cathode chamber 2 from the line 24 via the catalyst combustor 25. The branch line 26 is connected to the catalyst combustor 25 to feed air required from combusting unreacted $H_2$ or CO contained in the anode exhaust gas in the catalyst combustor 25. The cathode exhaust gas released from the cathode chamber 2 is discharged to atmosphere from the discharge line 27, whereas part of the anode exhaust gas is removed via a line 28 to recover $CO_2$.

To the cathode chamber 2 of the fuel cell FC, the exhaust gas utilization line 20 is connected to guide the exhaust gas discharged from the thermal power plant III so that a great volume of exhaust gas from the thermal power plant is fed to the cathode chamber 2 of the fuel cell FC as part of the oxidizing gas. Therefore, $CO_2$ required for reactions in the cathode chamber 2 is gained from the exhaust gas fed from the exhaust gas utilization line 9, and the exhaust gas with dilute $CO_2$ is released from the exit of the cathode chamber 2 via an exhaust line 27.

Now, let the discharge rate of $CO_2$ contained in the exhaust gas released from a 1,000,000-KW coal-fired thermal power plant be 0.42 $Nm^3$/KWH as discussed before. In implementing the present invention, a 500,000-KW coal-fired thermal power plant III is combined with a coal-gasified molten carbonate fuel cell power generator IV which consumes coal equivalent to 500,000 KW coal-fired thermal power generation which corrresponds to the coal for 1,000,000 KW coal-fired thermal power generation, and the exhaust gas released from the plant III is supplied to the cathode chamber 2. This will feed the exhaust gas containing 0.42 $Nm^3$/KWH of $CO_2$ to the cathode chamber 2 of the coal-gasified molten carbonate fuel cell FC from the thermal power plant III as part of oxidizing gas. This great volume of $CO_2$ is utilized in the reactions of equation (1) at the cathode chamber 2 togehter with $CO_2$ supplied to the cathode chamber 2 from the air supply line 23 and is converted to the carbonate ion $CO_3^{--}$. This carbonate ion $CO_3^{--}$ electrophoretically migrates in the electrolyte plate 1 and is carried to the anode 3. On the anode side, the reaction of equation (2) take place and $CO_2$ and $H_2O$ are released from the anode chamber 3, part of which is fed to the cathode 2 and used for reactions. Because the molten carbonate fuel cell FC has a shigh power generating efficienty, 650,000 KW output is obtained, thereby creating a facility of 1,150,000-KW power output by adding the power output of 500,000 KW of the thermal power plant III. This system not only provides a power output exceeding that of the existing 1,000,000 KW thermal power plant but also utilizes $CO_2$ in the reactions at the cathode, which can be removed in the form of condensed $CO_2$ as the anode exhaust gas. Therefore, $CO_2$ released to atmosphere from this combined system of thermal power generator and molten carbonate fuel cell generator is only those which cannot be separated and recovered at the cathode, and whose volume is reduced to just 0.1 $Nm^3$/KWH. With this system, the volume of $CO_2$ released to atmosphere becomes minute.

Figure 5:
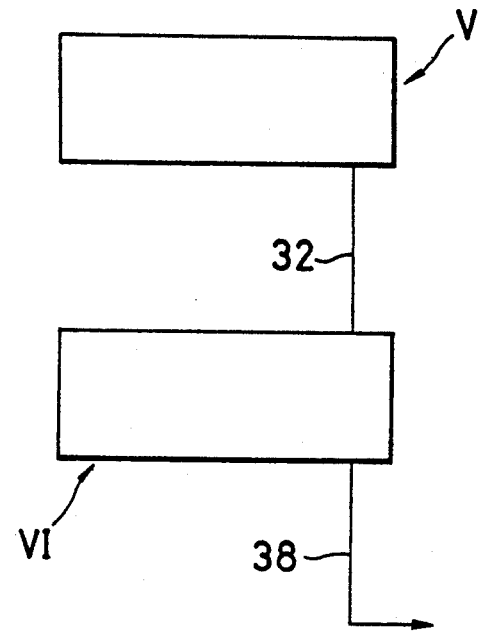
FIG. 5 is a schematic diagram showing yet another embodiment according to the present invention.
Figure 6:
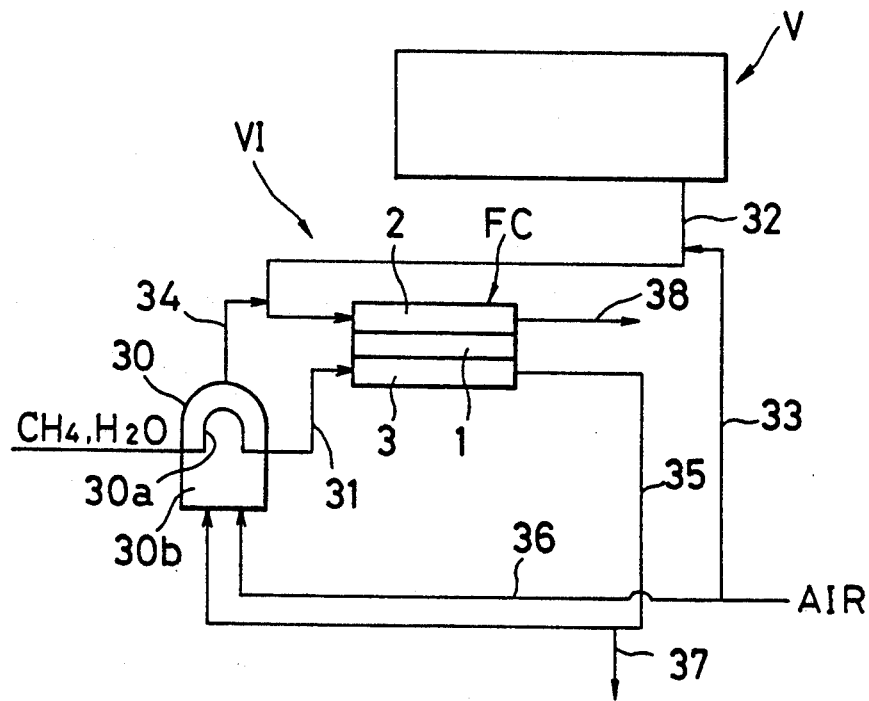
FIG. 6 illustrates part of FIG. 5.

FIGS. 5 and 6 show another embodiment of the present invention. Combined to the LNG as thermal power plant V, a natural gas reforming molten carbonate fuel cell power generator IV is installed and the exhaust gas $CO_2$ released from the thermal power plant V is used for power generation in the molten carbonate fuel cell FC to separate $CO_2$, thereby raising a total power output of the LNG thermal power plant V and molten carbonate fuel cell generator IV while reducing the $CO_2$ content of the exhaust gas released from the cathode of the fuel cell.

The fuel cell FC used in the natural gas reforming molten carbonate fuel cell generator VI is same as that in FIG. 1. The anode chamber 3 is designed to receive fuel gas reformed in the reformer 30a of the reformer 30 from the fuel gas supply line 31. The cathode chamber 2 is designed to receive the exhaust gas released from the thermal power plant V guided from the exhaust gas utilization line 32. The air is also fed to the cathode chambe 2 from the air supply line 33, and gas containing $CO_2$ released from the combustion chamber 30b of the reformer 30 is supplied to the cathode chamber 2 from the line 34 through the exhaust gas utilization line 32. To the combustion chamber 30b of the reformer 30, the anode exhaust gas is supplied via an anode exhaust gas line 35 as well as part of air fed from the branch line 36 and part of the anode exhaust gas is removed from the exhaust gas line 37.

In this embodiment, the $CO_2$ discharge rate from the LNG thermal powr plant V is 0.24 $Nm^3$/KWH as described above, but by supplying the exhaust gas containing such a large volume of $CO_2$ to the cathode chamber 2 of the natural gas reforming molten carbonate fuel cell FC from the exhaust gas utilization line 32 as part of oxidizing gas, $CO_2$ is separated from the exhaust gas discharged from the thermal power plant V through utilizing $CO_2$ of the exhaust gas for the reactions in the cathode, thereby controlling $CO_2$ in the exhaust gas released from the cathode 2 via an exhaust line 38 to be as small as 0.1 $Nm^3$/KHW. When the thermal power plant V is combined with the natural gas reforming molten carbonate fuel cell equipment VI as shown in FIG. 5 to form a plant corresponding to an existing 1,000,000 KW LNG thermal plant and the installed capacity of the thermal power plant V is made to be 500,00 KW, because of high power generating efficiency of the natural gas reforming molten carbonate fuel cell FC, 680,000 KW power generating output is obtained, and as a whole, the output of 1,180,000 KW can be obtained.

Figure 7:
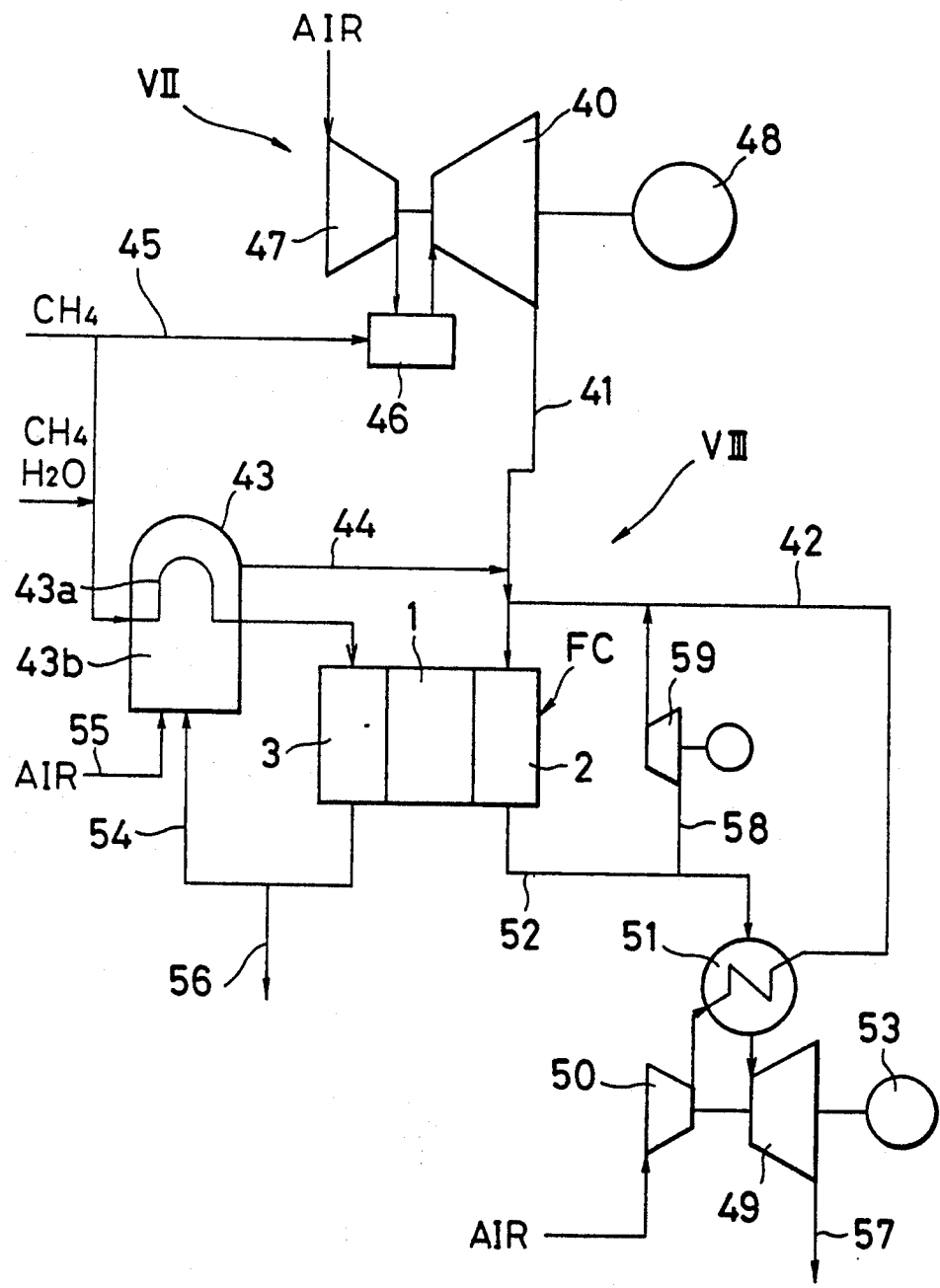
FIG. 7 is a schematic view of another embodiment according to the present invention.

FIG. 7 shows another embodiment of the present invention. In place of combining the thermal power plant and molten carbonate fule cell equipment described in the previous embodiments and utilizing $CO_2$ in the exhaust gas from the thermal power plant for power generation by the molten carbonate fuel cell to separate and recover $CO_2$, thereby discharging gas with dilute $CO_2$ to atmosphere, the gas turbine generator VII is installed in combination with the molten carbonate fuel cell power generator VIII, and the gas turbine generator is operated to generate power at the time of peak load. At this moment, the exhaust gas to be released to atmosphere is utilized for part of oxidizing gas to the molten carbonate fuel cell FC and at the same time the gas with little $CO_2$ is released to atmosphere. That is, for example, a simple open cycle gas turbine generator VII and a natural gas reforming molten carbonate fuel cell equipment VIII are combined and the exhaust gas utilization line 41 of the turbine 40 of the gas turbine generator VII is connected to the cathode chamber 2 entry of the molten carbonate fuel cell FC to allow the air from the air supply line 42 and the combustion gas of combustion section 43b of the reformer 43 from the combustion gas via a line 44 to join in the line 41. The gas turbine generator VII combusts the fuel supplied to the combustor 46 from the fuel supply line 45 with the air introduced from the compressor 47 and drives the turbine 40 by the high temperature high pressure combustion gas released from the combustor 46 to generate electric power with the generator 48 directly connected to the turbine 40. The natural gas reforming molten carbonate fuel cell power generating equipment VIII is designed to place an electrolyte plate 1 between the cathode C and anode A and supply the oxidizing gas to the cathode chamber 2 and the fuel gas to the anode chamber 3, respectively. Natural gas ($CH_4$) and steam ($H_2O$) are supplied to the anode chamber 3 of this fuel cell FC after they are reformed to the fuel gas at the reforming section 43a of the reformer 43. The air compressed by the compresor 50 which is rotated by the power turbine 49 is supplied to the cathode chamber 2. The cathode exhaust gas released from the cathode chamber 2 passes through the cathode exhaust gas line 52 and is fed back to the air supply line 42 via a blowr 59. The cathode exhaust gas released from the cathode chamber 2 passes through the cathode exhaust gas line 52 and after heat is removed by the air at the air preheater 51, it is guided to the power turbine 49 to drive the turbine 49, thereby generating electric power by the generator 53. The anode exhaust gas released from the anode chamber 3 is guided to the combustion chamber 43b of the reformer 43 through the anode exhaust gas line 54. Unreacted combustible gases contained in the anode exhasut gas are combusted with air supplied to the combustion chamber 43b via the line 55, and the gases containing $CO_2$ expelled from the combustion chamber 43b of the reformer 43 are fed to the cathode chamber 2. In addition, part of the anode exhaust gas is removed through the line 56. The cathode exhaust gas from the power turbine 49 is expelled to atmosphere through the exhaust line 57.

By providing the exhaust gas utilization line 41 between the turbine 40 and the cathode chamber 2 in a manner such that the exhaust gas from the turbine 40 of the gas turbine generator VII is guided to the cathode chamber 2 inlet of the fuel cell FC, the gas turbine generator VII and molten carbonate fuel cell power generating equipment IX are combined to obtain power output from both equipment simultaneusly. Numeral 58 designates a cathode recycle line.

In this embodiment, let the power output of the gas turbine generator VII be 15 MW and that of the molten carbonate fuel cell FC 26.2 MW and that of the generator 49 directly connected to the power turbine 49 be 4.5

MW. Therefore, when only the fuel cell power generation apparatus VIII is operated, the output is the sum of the above two, that is, 26.2+4.5=30.7 MW. Operating the gas turbine generator VII which is only operated during the peak load condition increases the power of the generator 53 which generates power by operation of the power turbine 49 and thus increases the output further by 9.1 MW. The total output becomes:

15+26.2+4.5+9.1=54.8 MW.

This means that the combined system is a power generation system of 50 KW class. In addition, because the gas turbine generator VII does not need any condenser as with the case of turbine power generator, the construction cost is low. Therefore, compared with the case where the molten carbonate fuel cell generating equipment VIII is only operated, operating together with the gas turbine generator can reduce the unit place per 1 KW of electric power remarkably. Thus, for an example, if the construction cost of a 30-MW-class natural gas reforming fuel cell power generating system VIII is 7.5 billion yen and that of the gas turbine generator VIII is 1.2 billion yen, the cost when only the fuel cell power generating system VIII is operated is: 7.5 billion yen÷30 MW=250,000 yen/KW, whereas the cost becomes lower when the output is brought to the 50 MW class by operating the gas turbine generator V, namely (7.5 billion yen÷1.2 billion yen)÷50 MW=174,000 yen/KW.

During the operation under the peak load condition, because the exhaust gas of the gas turbine 40 is supplied to the cathode chamber 2 of the fuel cell FC as part of the oxidizing gas without discharging to atmosphere, $CO_2$ contained in the exhaust gas is utilized as $CO_2$ required for the reactions at the cathode. Therefore, $CO_2$ discharged to atmosphere from the cathode chamber 2 is minute and same as in case of the foregoing embodiments, i.e., the $CO_2$ discharge rate can be made to be 0.1 $Nm^3$/KWH.

In all above-described embodiments, since as $CO_2$+$H_2O$ (anode exhaust gas) discharged from the anode chamber 3 of the fuel cell FC and part of unreacted $H_2$ and CO are drawn out of the circulation line by the branched line 56, $CO_2$, $H_2O$, unreacted $H_2$ and CO are separated in the subsequent process to recover $CO_2$. $CO_2$ recovered will be effectively used: for example, $CO_2$ is allowed to react with magnesium and calcium to produce magnesium oxide (MgO) and calcium oxide (CaO). MgO is used to manufacture catalyst, absorbent, magnesia cement and pharmaceuticals, while CaO is used for lining for furnaces and crucibles, construction materials and soil conditioners. $CO_2$ recovered as above may be used at a vegetable plant or solidified to a harmless substance and disposed to the environment.

In the foregoing embodiments, as examples, combination of the thermal power plant III or V and fuel cell power generation system IV or VI, and combination of the gas turbine generator VII and fuel cell power generator VIII are illustrated, but needless to say, the present invention should not limited to those combination of thermal power plants and fuel cell power generation systems. For example, the fuel cell power generator may be combined with a facility which generates air containing a great volume of $CO_2$, such as iron works or paper-manufacturing plant as well as thermal power plants, in an attempt to separate $CO_2$ as well as to generate power.

Figure 8:
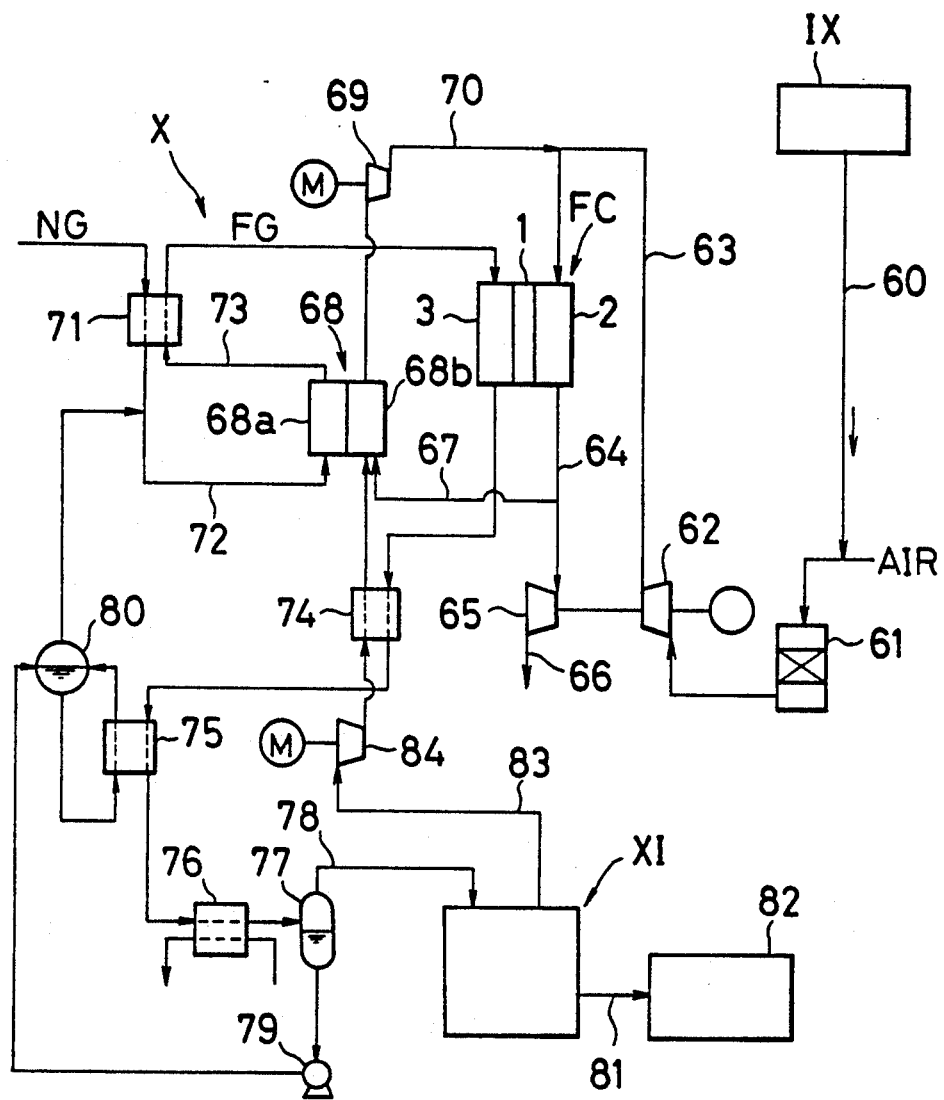
FIG. 8 illustrates an outline of another embodiment according to the present invention.

FIG. 8 shows a system to utilize and recover $CO_2$ according to the present invention. The system includes a molten carbonate fuel cell power generating system X and a $CO_2$ separator XI. The treated gas containing $CO_2$ released from the natural gas thermal power plant IX is supplied to the cathode chamber 2 of the molten carbonate fuel cell FC together with fresh air and natural gas (reformed material gas), after the reforming, is supplied to the anode. The $CO_2$ separator XI separates $CO_2$ from the gas containing $CO_2$.

More specifically, the molten carbonate fuel cell power generating system has a stacked fuel cell elements. Each cell element includes an electrolyte plate 1 soaked with molten carbonate sandwiched between a cathode (oxygen electrode) C and an anode (fuel electrode) A. The cathode chamber 2 and anode chamber 3 are formed on the cathode C and anode A respectively to make one cell element. To the cathode chamber 2 of the fuel cell FC which is formed by stacking these cell elements in multiple layers, fresh air compressed by the compressor 62 is supplied through the oxidizing gas supply line 63 after allowing it to pass the filter 61 together with the exhaust gas passing the exhaust gas utilization linr 60 from the thermal power plant IX. At the same time, the cathode exhaust gas released from the cathode chamber 2 is discharged to atmosphere after it is guided to the turbine 65 from the cathode exhaust gas line 64 and part of the cathode exhaust gas is allowed to pass through the branch line 67 to be guided to the combustion chamber 67b of the reformer 68. The exhaust gas released from the combustion chamber 68b of the reformer 68 is pressurized by the blower 69 and supplied to the cathode chamber 2 from the line 70. On the other hand, natural gas NG is preheated at the natural gas preheater 71, then is allowed to pass the natural gas supply line 72 and is guided to the reformer chamber 68a of the reformer 68, in which it is reformed to fuel gas FG and is finally supplied to the anode chamber 3 from the fuel gas supply line 73. The anode exhaust gas released from the anode chamber 3 is guided to the gas-liquid separator 77 via a heat exchanger 74, evaporator 75 and condenser 76. In the separator 77, water ($H_2O$) contained in the anode gas is separated, and gas containing $CO_2$ is introduced to the $CO_2$ separator XI from the leading line 78 to separate and recover $CO_2$. $H_2O$ separated at the gas-liquid separator 77 is then pressurized by the pump 79 and introduced into a liquid storing container 80. After that, it is evaporated to steam by the evaporator 75 and led to the midst of the natural gas supply line 72 to be mixed with natural gas.

The $CO_2$ separator XI separates $CO_2$ of the gas after it is separated from the water at the gas-liquid separator 77, removes and recovers the separated $CO_2$ from the recovery line 81 and sends it to the $CO_2$ treating device 82. Also, the $CO_2$ separator XI returns the remaining gas, after recovery of $CO_2$, to the fuel cell power generation system X through the line 83 and guides it into the combustion chamber 68b of the reformer 68 via the heat exchanger 74 from the blower 84. There are two types of $CO_2$ separator XI: one that recovers $CO_2$ in the form of gas and the other that cools $CO_2$ with cryogenic fluid and recovers it in the form of liquid.

To recover $CO_2$ from the exhaust gas released from the thermal power plant IX, the exhaust gas is introduced into the oxidizing gas supply line 63 from the exhaust gas utilization line 60, compressed together with air by the compressor 62 and supplied to the cathode chamber 2. On the other hand, natural gas gasified by the $CO_2$ separator XI is guided to the natural gas supply line 72 and reformed at the reformer 68, then as the fuel gas FG, it undergoes cell reactions at the anode chamber 3 to condense and remove $CO_2$ from the anode chamber 3.

As the reactions take place on both cathode and anode sides, power is generated and $CO_2$ moves from the cathode to the anode. The gas flow rate in the cathode chamber 3 is a fraction of that of the cathode chamber 2, and therefore, $CO_2$ moved to the anode chamber 3 is condensed resulting in concentration of several times. Consequently, in the fuel cell FC, $CO_2$ condensation takes place as well as power generation.

The anode gas with $CO_2$ condensed at the anode chamber 3 is sent to the gas-liquid separator 77 via the heat exchanger 74, evaporator 75 and condenser 76. In the separator 77, $H_2O$ is separated and removed, then it is guided to the $CO_2$ separator XI by the leading line. In the $CO_2$ separator XI, $CO_2$ is separated from the gas and removed through the recovery line 81 to be recovered. The recovered $CO_2$ is sent to the $CO_2$ treating device 82. In this event, if $CO_2$ is recovered in the form of gas, $CO_2$ is separated and recovered without any further processing, while if $CO_2$ is recovered in the form of liquid, $CO_2$ is cooled to liquid with the cryogenic liquid. After $CO_2$ is recovered by the $CO_2$ separator XI, the remaining gases are guided to the combustion chamber 68b of the reformer 68 through the heat exchanger 74 in the fuel cell power generation system by the line 83 and recycled to the cathode chamber 2.

With respect to recovery of $CO_2$, if the exhaust gas containing 9% $CO_2$ relative to the total gas flow rate is processed, for example, the $CO_2$ concentration of 7% of the gas entering the cathode chamber 2 is condensed to 42% at the exit of the anode chamber 3, the $CO_2$ concentration of the gas guided to the $CO_2$ separate XI from the $CO_2$ leading line 78 is condensed to 82%, the $CO_2$ concentration of the gas guided to the line 83 from the $CO_2$ separator XI is 74%, the gas recovered by the $CO_2$ separator XI is 100% and the $CO_2$ concentration of the gas discharged to the atmosphere via the turbine 65 can be reduced to 3%.

In order to obtain this result, a certain range should be assigned to the Mol ratio of exhaust gas to fresh air supplied to the cathode chamber 2 and $CO_2$ recovery ratio of the $CO_2$ separator XI. For this purpose, followings are recommended:

(1) Keep the Mol ratio of the exhaust gas to air supplied to 1-0.65; and (2) Keep the $CO_2$ volume recovered from the recovery line 81 in the $CO_2$ separator XI to be 0.2-0.4 relative to the $CO_2$ volume introduced to the $CO_2$ separator XI from the leading line 78.

These operating ranges are specified in order to:

(i) secure the proper content of $CO_2$ and $O_2$ at the cathode chamber 2 inlet of the fuel cell FC and the proper $O_2$ content at the exit of the combustion chamber 68b of the reformer 68; and (ii) bring the $CO_2$ reduction ratio of the gas released from the equipment below 1, that is, the ratio of $CO_2$ released to the atmosphere after passing the turbine 65 to the $CO_2$ content in the exhaust gas should be reduced under 1.

Figure 9:
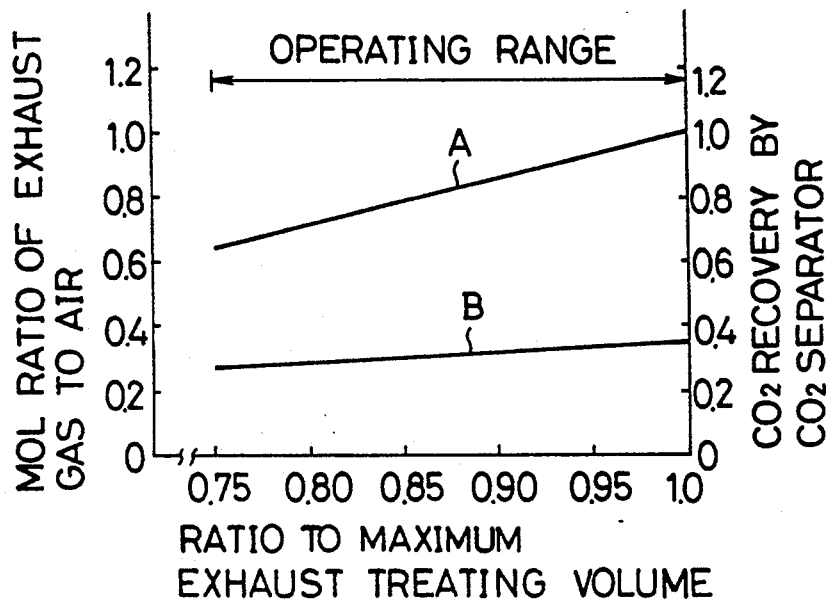
FIG. 9 plots Mol ratio of exhaust gas to air and operating range of $CO_2$ recovery ratio.
Figure 10:
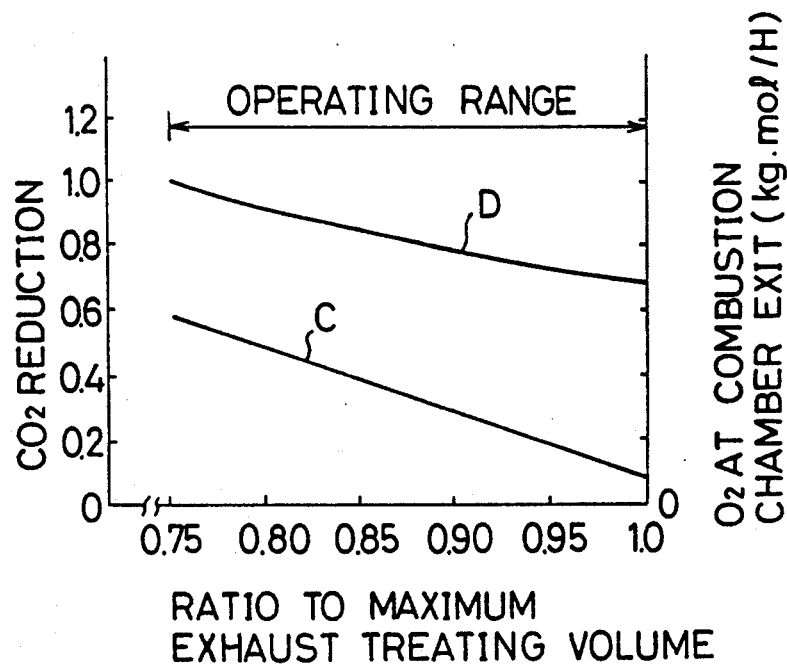
FIG. 10 is a view showing $O_2$ rate at a combustion chamber exit of a reformer and $CO_2$ reduction rate in the operating range of FIG. 9.

According to the above operating conditions, if the Mol ratio of the exhaust gas to air is set to 1-0.65 as indicated by the line A of FIG. 9 and the $CO_2$ recovery ratio of the $CO_2$ separator XI is set to 0.2-0.4 as indicated by the line B, the $O_2$ content and $CO_2$ reduction ratio at the combustion chamber exit of the reformer 68 satisfy the conditions (i) and (ii) as indicated by the lines C and D of FIG. 10, respectively.

In the above description, if the $CO_2$ recovery ratio is set to about 0.2-0.4 as shown in FIG. 9, the $CO_2$ partial pressure, as $CO_2$ is liquefied and separated, increases and the power required can be reduced.

The present invention is not limited to any of the above embodiments. The embodiments deal with the cases of recovering $CO_2$ in the combustion exhaust gas released from the natural-gas-fired thermal power plants by utilizing the recovered $CO_2$ for power generation, but the same principle can be applied to the gases released from plants other than thermal power plants, and the above-described molten carbonate fuel cell power generation system only represents one example. Also, another molten carbonate fuel cell may be provided in the downstream line 66 of the turbine 65.

What is claimed is:

1. A method of recovering carbon dioxide gas from combustion exhaust gas of fossil fuel, using a fossil fuel combustion equipment, a molten carbonate fuel cell and a reformer, the fuel cell having anode, anode chamber, cathode, cathode chamber and electrolyte and the reformer having a reforming chamber and a combustion chamber, comprising:

supplying anode gas to the anode chamber of the fuel cell and oxidizing gas supplied to the cathode chamber;

feeding gases produced upon combustion (called "combustion exhaust gas") to the cathode chamber as part of the oxidizing gas;

allowing $CO_2$ of the combustion exhaust gas to react with $O_2$ of the oxidizing gas at the cathode to produce carbonate ion;

allowing the carbonate ion to pass through the electrolyte of the fuel cell and reach the anode;

allowing the carbonate ion to react with hydrogen of the fuel gas at the anode to produce $CO_2$ and $H_2O$;

discharging gases produced at the anode (called "anode exhaust gas") from the anode chamber, which gases containing $CO_2$, $H_2O$, unreacted $H_2$ and CO;

feeding the anode exhaust gas to the combustion chamber of the reformer as combustible gas to be burned in the combustion chamber of the reformer; and separating $H_2O$ from the anode exhaust gas expelled from the combustion chamber of the reformer and recovering high-concentration $CO_2$ gas.

2. The method of claim 1, wherein the fuel gas supplied to the anode chamber of the molten carbonate fuel cell includes $H_2$, CO and $H_2O$.

3. The method of claim 1, wherein the oxidizing gas supplied to the cathode chamber of the molten carbonate fuel cell includes $CO_2$, $O_2$ and $N_2$.

4. The method of claim 2, wherein the fuel gas is produced by reforming natural gas with steam in the reforming chamber of the reformer.

5. The method of claim 4, wherein the anode exhaust gas is mixed with air and guided to the combustion chamber of the reformer, and unreacted combustible gases contained in the anode exhaust gas are combusted in the combustion chamber to be used as heat source for reforming reactions.

6. The method of claim 1, wherein the combustion exhaust gas is directly supplied to the cathode chamber from the fossil fuel combustion equipment.

7. The method of claim 5, wherein $H_2O$ is separated by condensing the anode exhaust gas discharged from the combustion chamber of the reformer and high-concentration $CO_2$ gas produced upon removal of $H_2O$ is condensed to recover $CO_2$.

8. The method of claim 1, wherein a majority of $CO_2$ contained in the oxidizing gas supplied to the cathode chamber is removed and released from the cathode chamber.

9. A method of recovering carbon dioxide gas from combustion exhaust gas of fossil fuel, using a fossil fuel combustion equipment, a molten carbonate fuel cell and a reformer, the fuel cell having anode, anode chamber, cathode, cathode chamber and electrolyte and the reformer having a reforming chamber and a combustion chamber, comprising:

supplying fuel gas to the anode chamber of the fuel cell and oxidizing gas supplied to the cathode chamber;

feeding gases produced upon combustion (called "combustion exhaust gas") to the cathode chamber as part of the oxidizing gas;

allowing $CO_2$ of the combustion exhaust gas to react with $O_2$ of the oxidizing gas at the cathode to produce carbonate ion;

allowing the carbonate ion to pass through the electrolyte of the fuel cell and reach the anode;

allowing the carbonate ion to react with hydrogen of the fuel gas at the anode to produce $CO_2$ and $H_2O$;

discharging gases produced at the anode (called "anode exhaust gas") from the anode chamber, which gases containing $CO_2$ and $H_2O$; and separating $H_2O$ from the anode exhaust gas and recovering high-concentration $CO_2$ gas.

10. The method of claim 9, wherein the fuel gas supplied to the anode chamber of the molten carbonate fuel cell includes $H_2$, CO and $H_2O$.

11. The method of claim 9, wherein the oxidizing gas supplied to the cathode chamber of the molten carbonate fuel cell includes $CO_2$, $O_2$ and $N_2$.

12. The method of claim 9, wherein the fuel gas is produced by reducing natural gas with steam in the reforming chamber of the reformer.

13. The method of claim 12, wherein combustible gases are supplied into the combustion chamber of the reformer and burned therein to maintain reforming reaction temperature of the reforming chamber.

14. The method of claim 9, wherein the combustion exhaust gas is directly supplied to the cathode chamber from the fossil fuel combustion equipment.

15. The method of claim 9, wherein a majority of $CO_2$ contained in the oxidizing gas supplied to the cathode chamber is removed and released from the cathode chamber.

16. The method of claim 9, wherein the anode exhaust gas is condensed to separate $H_2O$ and the high concentration $CO_2$ gas from which $H_2O$ has been removed is further condensed to recover $CO_2$.

17. A method of recovering carbon dioxide gas from combustion exhaust gas of fossil fuel, using a fossil fuel combustion equipment, a molten carbonate fuel cell, a reformer and a catalyst combustor, the fuel cell having anode, anode chamber, cathode, cathode chamber and electrolyte and the reformer having a reforming chamber and a combustion chamber, comprising:

supplying fuel gas to the anode chamber of the fuel cell and oxidizing gas supplied to the cathode chamber;

feeding gases produced upon combustion (called "combustion exhaust gas") to the cathode chamber as part of the oxidizing gas;

allowing $CO_2$ of the combustion exhaust gas to react with $O_2$ of the oxidizing gas at the cathode to produce carbonate ion;

allowing the carbonate ion to pass through the electorolyte of the fuel cell and reach the anode;

allowing the carbonate ion to react with hydrogen of the fuel gas at the anode to produce $CO_2$ and $H_2O$;

discharging gases produced at the anode (called "anode exhaust gas") from the anode chamber, which gases containing $CO_2$ and $H_2O$; and discharging the cathode exhaust gas, from which $CO_2$ has been removed, to atmosphere from the cathode chamber.

18. The method of claim 17, wherein the fuel gas supplied to the anode chamber of the molten carbonate fuel cell includes $H_2$, CO and $H_2O$.

19. The method of claim 17, wherein the oxidizing gas supplied to the cathode chamber of the molten carbonate fuel cell includes $CO_2$, $O_2$ and $N_2$.

20. The method of claim 17, wherein combustion exhaust gas discharged from a thermal power plant is directly introduced into the cathode chamber and the combustion exhaust gas is mixed with air so that $CO_2$ of the combustion exhaust gas is diluted before expelled to atmosphere.

21. The method of claim 17, wherein part of the anode exhaust gas from the anode chamber is recirculated into the anode chamber and another part of the anode exhaust gas is introduced into a catalyst combustor such that unreacted combustible gases contained in the anode exhaust gas is burned with air fed into the catalyst combustor and gases upon the combustion are guided to the cathode chamber.

22. A method of recovering carbon dioxide gas from combustion exhaust gas of fossil fuel, using a fossil fuel combustion equipment, a molten carbonate fuel cell and a reformer, the fuel cell having anode, anode chamber, cathode, cathode chamber and electrolyte and the reformer having a reforming chamber and a combustion chamber, comprising:

reforming gas with steam to fuel gas and feeding the fuel gas into the anode chamber of the fuel cell;

feeding the combustion exhaust gas with air into the cathode chamber as oxidizing gas;

allowing $CO_2$ of the combustion exhaust gas to react with $O_2$ of the oxidizing gas at the cathode to produce carbonate ion;

allowing the carbonate ion to pass through the electorolyte of the fuel cell and reach the anode;

allowing the carbonate ion to react with hydrogen of the fuel gas at the anode to produce $CO_2$ and $H_2O$;

feeding from the anode chamber to the combustion chamber of the reformer gases produced at the anode (called "anode exhaust gas") from the anode chamber, which gases containing $CO_2$ and $H_2O$;

feeding air into the combustion chamber of the reformer to combust unreacted combustible gases contained in the anode exhaust gas thereby maintaining reforming reaction temperature of the reformer; and discharging from the cathode chamber to atmosphere the cathode exhaust gas, from which $CO_2$ has been removed.

23. The method of claim 22, wherein the combustion exhaust gas includes gases discharged from a thermal power plant, the combustion exhaust gas is mixed with air and gases discharged from the combustion chamber of the reformer before introduced into the cathode chamber so that $CO_2$ of the combustion exhaust gas is diluted before expelled to atmosphere.

24. A method of recovering carbone dioxide gas contained in combustion exhaust gas discharged from a turbine generator, the turbine generator having a compressor, comprising:

supplying air into the compressor of the turbine generator and compressing the air by the compressor;

feeding natural gas into the compressed air to combust the natural gas and feeding the combusted gas to the turbine to drive the generator;

reforming gas with steam to produce fuel gas;

feeding the fuel gas into the anode chamber of the fuel cell;

mixing with air the combustion exhaust gas discharged from the turbine and feeding the combustion exhaust gas as oxidizing gas into the cathode chamber;

allowing $CO_2$ of the combustion exhaust gas to react with $O_2$ of the oxidizing gas at the cathode to produce carbonate ion;

allowing the carbonate ion to pass through the electorolyte of the fuel cell and reach the anode;

allowing the carbonate ion to react with hydrogen of the fuel gas at the anode to produce $CO_2$ and $H_2O$;

discharging gases produced at the anode (called "anode exhaust gas") from the anode chamber, which gases containing $CO_2$ and $H_2O$; and discharging the cathode exhaust gas, from which $CO_2$ has been removed, to atmosphere from the cathode chamber.

25. The method of claim 24, wherein the natural gas and steam are fed into the reforming part of the reformer to produce combustion gas containing $H_2$, CO and $H_2$ and the combustion gas is introduced into the anode chamber.

26. The method of claim 25, wherein part of the anode exhaust gas from the anode chamber is fed into the combustor of the reformer such that unreacted combustible gases contained in the anode exhaust gas are burned with air introduced into the combustor to maintain reforming reactions at the reforming part.

27. The method of claim 26, wherein gases discharged from the combustor of the reformer are fed into the cathode chamber as the oxidizing gas.

28. The method of claim 27, wherein the cathode exhaust gas is fed to a power turbine of an auxiliary generator to drive the auxiliary generator, and air fed into a compressor of the auxiliary generator is compressed and introduced into the cathode chamber.

29. A method of recovering carbon dioxide gas from a combustion exhaust gas of fossil fuel, using a fossil fuel combustion equipment, a molten carbonate fuel cell and a reformer, the fuel cell having anode, anode chamber, cathode, cathode chamber and electrolyte and the reformer having a reforming chamber and a combustion chamber, comprising:

supplying air into the combustion exhaust gas of the fossil fuel and then feeding them into the cathode chamber of the fuel cell as the oxidizing gas;

feeding the fuel gas to the anode chamber of the fuel cell;

allowing $CO_2$ of the combustion exhaust gas to react with $O_2$ of the oxidizing gas at the cathode to produce carbonate ion;

allowing the carbonate ion to pass through the electrolyte of the fuel cell and reach the anode;

allowing the carbonate ion to react with hydrogen of the fuel gas at the anode to produce $CO_2$ and $H_2O$;

discharging from the anode chamber gases produced at the anode (called "anode exhaust gas") from the anode chamber, which gases containing $CO_2$ and $H_2O$; and separating $H_2O$ from the anode exhaust gas and recovering high concentration $CO_2$ gas.

30. The method of claim 29, wherein the combustion exhaust gas and air are pressurized and then supplied into the cathode chamber.

31. The method of claim 29, wherein the natural gas is reformed with steam at the reforming chamber of the reformer to produce the fuel gas and the fuel gas is supplied to the anode chamber.

32. The method of claim 29, wherein the anode exhaust gas from the anode chamber is condensed to remove $H_2O$, the high concentration $CO_2$ gas from which $H_2O$ has been removed is further condensed to recover $CO_2$.

33. The method of claim 32, wherein the anode exhaust gas after the $CO_2$ recovery is fed into the combustion chamber of the reformer, part of the cathode exhaust gas is fed into the combustion chamber of the reformer, unreacted combustible gases contained in the anode exhaust gas are burned with unreacted $O_2$ contained in the cathode exhaust gas at the combustion chamber to be used as heat source of reforming reactions at the reforming chamber.

34. The method of claim 33, wherein exhaust gas from the combustion chamber of the reformer is fed into the cathode chamber as the oxidizing gas.

35. An apparatus for recovering carbon dioxide gas from combustion exhaust gas of fossil fuel, using a fossil fuel combustion equipment, comprising:

a molten carbonate fuel cell, the fuel cell including a plurality of cell elements piled up, each cell element including an electrolyte tile soaked with molten carbonate, an anode, anode chamber, cathode and cathode chamber with the electrolyte tile being sandwiched by the anode and cathode;

means for supplying fuel gas to the anode chamber of the fuel cell;

means for supplying oxidizing gas supplied to the cathode chamber of the fuel cell;

means for feeding gases produced upon combustion at the combustion equipment (called "combustion exhaust gas") to the cathode chamber; and means for separating $H_2O$ from the anode exhaust gas and recovering $CO_2$.

36. The apparatus of claim 35, wherein the fuel gas supply means includes a reformer, the reformer has a reforming chamber for reforming natural gas with steam and has a combustion chamber for maintaining reforming reaction temperature of the reforming chamber.

37. The apparatus of claim 35, wherein the oxidizing gas supply means includes a line for introducing oxidizing gas such as air into the cathode chamber, and a combustion exhaust gas line extending from the fossil fuel combustion equipment is connected with the oxidizing gas introducing line.

38. The apparatus of claim 36, wherein an exit of the anode chamber is connected with the combustion chamber of the reformer by an anode exhaust gas line, an air feed line is connected to the anode exhaust gas line and unreacted combustible gases contained in the anode exhaust gas are combusted in the combustion chamber.

39. The apparatus of claim 38, wherein the $H_2O$ separating and $CO_2$ recovering means draws the anode exhaust gas from the combustion chamber of the reformer and includes a condenser for condensing $H_2O$ contained in the anode exhaust gas and a carbone dioxide recovering device for recovering carbon dioxide gas discharged from the condenser in the form of liquid.

40. An apparatus for recovering carbon dioxide gas from combustion exhaust gas of fossil fuel, using a fossil fuel combustion equipment, comprising:
 a molten carbonate fuel cell, the fuel cell including a plurality of cell elements piled up, each cell element including an electrolyte tile soaked with molten carbonate, an anode, anode chamber, cathode and cathode chamber with the electrolyte tile being sandwiched by the anode and cathode;
 a reformer having a reforming chamber for reforming natural gas with steam and a combustion chamber for maintaining reforming reactions at the reforming chamber;
 means for supplying fuel gas reformed by the reforming chamber of the reformer into the anode chamber of the fuel cell;
 means for supplying oxidizing gas supplied to the cathode chamber of the fuel cell;
 means for feeding gases produced upon combustion at the combustion equipment (called "combustion exhaust gas") to the cathode chamber; and
 means for directly introducing the anode exhaust gas from the anode chamber to separate $H_2O$ from the anode exhaust gas and recover $CO_2$.

41. The apparatus of claim 40, wherein the oxidizing gas supply means includes a line for introducing oxidizing gas such as air into the cathode chamber, and a combustion exhaust gas line extending from the fossil fuel combustion equipment is connected with the oxidizing gas introducing line.

42. The apparatus of claim 40, wherein excessive fossil fuel to the combustion equipment is guided into the combustion chamber of the reformer to be burned therein.

43. The apparatus of claim 40, wherein the $H_2O$ separating and $CO_2$ recovering means draws the anode exhaust gas from the anode chamber and includes a condenser for condensing $H_2O$ contained in the anode exhaust gas and a carbone dioxide recovering device for recovering carbon dioxide gas discharged from the condenser in the form of liquid.

44. An apparatus for recovering carbon dioxide gas from combustion exhaust gas of fossil fuel, from fossil fuel combustion equipment, comprising:
 a molten carbonate fuel cell, the fuel cell including a plurality of cell elements piled up, each cell element including an electrolyte tile soaked with molten carbonate, an anode, anode chamber, cathode and cathode chamber with the electrolyte tile being sandwiched by the anode and cathode;
 a reformer having a reforming chamber for reforming natural gas with steam and a combustion chamber for maintaining reforming reactions at the reforming chamber;
 means for supplying fuel gas reformed by the reforming chamber of the reformer into the anode chamber of the fuel cell;
 a carbon dioxide gas utilization line for delivering exhaust gas from fossil fuel combustion equipment to the cathode chamber of the fuel cell; and
 means for feeding air into the utilization line.

45. The apparatus of claim 44, in combination with fossil fuel combustion equipment comprising a thermal power plant.

46. The apparatus of claim 44, wherein a discharge line for expelling to atmosphere the cathode exhaust gas from whose $CO_2$ has been diluted is connected to the cathode chamber.

47. The apparatus of claim 46, wherein an exit of the anode chamber is connected with the combustion chamber of the reformer by an anode exhaust gas line, the air feed line is connected with the combustion chamber and a line for guiding unreacted combustible gases of the anode exhaust gas is connected to the combustion chamber such that the unreacted combustible gases of the anode exhaust gas are burned at the combustion chamber, and an exit of the combustion chamber is connected to the utilization line.

48. An apparatus for recovering carbon dioxide gas from combustion exhaust gas of fossil fuel, from a gas turbine generator, comprising:
 a molten carbonate fuel cell, the fuel cell including a plurality of cell elements piled up, each cell element including an electrolyte tile soaked with molten carbonate, an anode, anode chamber, cathode and cathode chamber with the electrolyte tile being sandwiched by the anode and cathode;
 a reformer having a reforming chamber for reforming natural gas with steam and a combustion chamber for maintaining reforming reactions at the reforming chamber;
 means for supplying fuel gas reformed by the reforming chamber into the anode chamber of the fuel cell;
 a carbon dioxide gas utilization line connecting with the cathode chamber for supplying combustion exhaust gas into the cathode chamber; and
 means for feeding pressurized air into the carbon dioxide gas utilization line.

49. The apparatus of claim 48, and further including a discharge line for expelling to atmosphere the cathode exhaust gas whose $CO_2$ has been diluted, and connected to the cathode chamber, means for connecting a power turbine of an auxiliary turbine generator which is driven by the cathode exhaust gas to the discharge line and wherein a discharge end of a compressor of the power generator is connected to the carbon dioxide gas utilization line by the pressurized air line.

50. The apparatus of claim 48, wherein a discharge line for the anode exhaust gas is connected to the exit of the anode chamber, a line for introducing part of the anode exhaust gas into the combustion chamber of the reformer is connected to the exit of the anode chamber such that unreacted combustible gases of the anode exhaust gas are burned at the combustion chamber, and an exit of the combustion chamber is connected to the utilization line.

51. An apparatus for recovering carbon dioxide gas from combustion exhaust gas of fossil fuel, from a fossil fuel combustion equipment, comprising:

a molten carbonate fuel cell, the fuel cell including a plurality of cell elements piled up, each cell element including an electrolyte tile soaked with molten carbonate, an anode, anode chamber, cathode and cathode chamber with the electrolyte tile being sandwiched by the anode and cathode;

a reformer having a reforming chamber for reforming natural gas with steam and a combustion chamber for maintaining reforming reactions at the reforming chamber;

means for supplying fuel gas reformed by the reforming chamber of the reformer into the anode chamber of the fuel cell;

a carbon dioxide gas utilization line for delivering exhaust gas from fossil fuel combustion equipment to the cathode chamber of the fuel cell;

means for feeding air into the carbon dioxide gas utilization line; and means for drawing the anode exhaust gas and separating $H_2O$ from the anode exhaust gas and recovering $CO_2$.

52. The apparatus of claim 51, and further including a cathode gas discharge line for expelling the cathode exhaust gas connected to the cathode chamber, means for connecting a turbine of an auxiliary turbine generator to the cathode gas discharge line and means for connecting a compressor of the auxiliary generator to the utilization line.

53. The apparatus of claim 51, wherein the $H_2O$ separating and $CO_2$ recovering means draws the anode exhaust gas from the anode chamber and includes a condenser for condensing $H_2O$ contained in the anode exhaust gas and a carbon dioxide recovering device for recovering carbon dioxide gas discharged from the condenser in the form of liquid.

54. The apparatus of claim 53, wherein a line for supplying into the combustion chamber of the reformer the anode exhaust gas whose $CO_2$ is removed by the carbon dioxide gas recovering device is connected to the carbon dioxide gas recovering device and unreacted combustible gases contained in the anode exhaust gas are burned in the combustion chamber.

55. The apparatus of claim 54, wherein a line for supplying gases discharged from the combustion chamber of the reformer into the cathode chamber via the utilization line is connected to the combustion chamber of the reformer.

* * * * *